United States Patent Office 3,294,716
Patented Dec. 27, 1966

3,294,716
MOISTURE RESISTANT STARCH BASE
CORRUGATING ADHESIVE
George C. Pinney, Decatur, Ill., assignor to A. E. Staley
Manufacturing Company, Decatur, Ill., a corporation
of Delaware
No Drawing. Filed Mar. 18, 1963, Ser. No. 266,035
4 Claims. (Cl. 260—17.2)

This invention relates primarily to innovations in alkaline starch base adhesives for use in the manufacture of moisture or weather resistant corrugated paperboard. While the starch base adhesives of this invention are primarily suited for use in the production of corrugated paperboard, they may also be used for other related adhesive purposes such as in the production of laminated or solid paperboard.

The use of alkaline starch base adhesives in the production of corrugated paperboard is well known and described, for example, on pages 595–598 of Chemistry and Industry of Starch, Ralph W. Kerr, 2nd ed., 1950, Academic Press Inc., New York, N.Y. Kerr refers to the Bauer Patents 2,051,025; 2,102,937 and 2,212,557 which disclose a procedure in which a batch of corrugating adhesive is prepared by first pasting a portion of the starch so as to form the so-called "carrier" which serves to suspend the balance of the starch in the raw or unpasted condition. Sodium hydroxide is normally added to lower the gelatinization temperature of the raw starch and thereby increase the speed (i.e. "machine speed") at which the adhesive may be applied. Borax is normally used in the Bauer adhesive and acts to greatly increase the viscosity when the raw starch is gelatinized thereby also increasing the machine speed.

Numerous improvements on the Bauer corrugating adhesive have been proposed as reflected by the patent and technical literature. For the most part, these proposed improvements have not gained commercial acceptance. A number of these improvements have been concerned with improving the moisture resistance of the resulting corrugating board since corrugated board made with starch base adhesive alone has poor moisture and weather resistance. The need for corrugated paperboard having improved moisture and weather resistance has become increasingly important in recent years as the use of corrugated paperboard shipping containers has increased to the point where, at the present time, corrugated board constitutes the main material used in making shipping cartons and containers. The standard specification for moisture or weather resistance corrugated paperboard requires that a sample must not show voluntary ply separation upon being immersed in water at 70–80° F. for 24 hours.

Patent 2,884,389 to Corwin and Person, dated April 28, 1959, and Patent 2,886,541 to Langlois and Pinney, dated May 12, 1959, disclose improvements in the manufacture of alkaline starch base corrugating adhesive whereby adhesives can be produced which are highly water resistant to water proof in nature. Briefly, these two patents disclose reacting a phenolic compound, such as resorcinol, with an aldehyde such as formaldehyde, under alkaline conditions in the presence of pasted starch so as to form in situ a phenolic-aldehyde resin-starch reaction product. The teaching of these two patents has been employed on a substantial commercial scale in the production of highly water resistant to water proof corrugated and laminated paperboard products. However, the resorcinol content (about 3½%) of the commercial corrugating adhesives made in accordance with these patents is such that the price of the adhesive is substantially increased over and above the cost of ordinary unmodified starch base corrugating adhesive as taught by the Bauer patents and commonly referred to as "domestic paste." Accordingly, while these patents teach a practical method and formulations for preparing highly water resistant to water proof starch base adhesives for corrugating and laminating paperboard products, there have been difficulties with their use in certain applications. Such adhesives are expensive and the expense does not permit their use in most of the corrugated board produced. This is of particular importance in applications that do not require the high degree of water resistance that is obtained with such adhesives. Accordingly, it has been necessary to use domestic paste in many areas where some water resistance is necessary. Typical of such applications are cartons used to package frozen foods such as frozen orange juice. Here the water resistance required is only that necessary to resist the frost and condensation that forms during storage. Domestic paste does not have the water resistance necessary for this purpose, but, on the other hand, the Corwin et al. and Langlois et al. adhesives have far more water resistance than is needed and are too expensive to use unless such water resistance is required. Workers in this art have sought other means for producing starch base corrugating adhesives that would be less expensive but provide an adequate degree of moisture or weather resistance to the corrugated paperboard. For example, one development calculated to accomplish this purpose is disclosed in Patent 3,019,120 to Bauer and Elizer.

Langlois and Pinney pointed out in their Patent 2,886,541 that increased amounts of the phenolic and aldehyde reagents in their system imparted greater water resistance to the corrugated or laminated board made with their adhesives while increasing the starch or dextrin content resulted in lower water resistance of the adhesive. It would be therefore presumed that to make a less expensive starch base corrugating adhesive in accordance with the Langlois and Pinney Patent 2,886,541 and the Corwin and Person Patent 2,884,389, having decreased water resistance, would merely involve cutting back on the content of the phenolic and aldehyde reagents to the point where the starch base adhesives would exhibit or impart an adequate amount of weather and moisture resistance at an acceptable cost. However, cutting back on the content of these resin precursors posed a problem with respect to maintaining normal machine speed. It was known from work on the improvements described in Patents 2,884,389 and 2,886,541 that incorporation of the normal amount of borax in these particular formulations acted to decrease substantially the water resistance that would otherwise be obtained, and borax is therefore omitted from such formulations. Based on experience with domestic paste, the omission of borax meant that machine speed would ordinarily have to be sacrificed. Fortunately, relatively high concentrations of resorcinol or other phenolic reactant in these formulations appeared to compensate to a large extent for the omission of the borax and permit operation at machine speeds lower than those with domestic paste but still higher than those that would have been expected, given the omission of the borax. However, when lesser amounts of resorcinol or the like were used so as to obtain only moisture or weather resistance as distinguished from water resistance, machine speeds had to be reduced still further until at low concentrations, the speeds were prohibitively low. At the same time, experience indicated that addition of normal amounts of borax would decrease the expected moisture resistance.

Nevertheless, tests were made using appropriately decreased concentrations of the phenolic and aldehyde resin precursors and it was unexpectedly discovered that at these lower concentrations (i.e. under 2% phenolic compound, e.g. resorcinol) the addition of normal amounts of borax permitted machine speeds not only equal to those of the high-resorcinol adhesives but equal, in fact, to those obtained with domestic paste, and this was obtained without loss of moisture resistance. In fact, the addition of the normal amount of borax did not have any noticeable effect, one way or the other, on the weather or moisture resistance of the adhesives containing less than 2% resorcinol or the like and the proportionate concentration of aldehyde disclosed in Patents 2,884,389 and 2,886,541. Once this discovery was made and verified, it then became possible to develop formulations in accordance with the present invention utilizing the in situ phenolic-aldehyde resin starch compound to produce starch base corrugating adhesives that could be used to make weather and moisture resistant corrugated board at normal machine speeds and without excessively adding to the cost of the adhesive.

Accordingly, the object of this invention, generally stated, is the provision of economical alkaline starch base corrugating adhesive formulations which may be prepared in conventional equipment and used in corrugating machines operating at normal speed to produce weather or moisture resistant corrugated board, such formulations being characterized in respect to their content of small enough concentrations of phenolic and aldehyde reagents so as not to add greatly to the cost thereof while permitting normal concentration of borax so as to permit normal machine speeds.

More specifically, an important object of the invention is the provision of alkaline starch base corrugating adhesives of the general type disclosed in the Corwin and Person Patent 2,884,389 and the Langlois and Pinney Patent 2,886,541 but with substantially smaller concentrations of the phenolic and aldehyde reactants (i.e., less than 2% of the phenolic reactant and a proportional amount of the aldehyde) while containing normal additions of borax so as to provide adhesive formulations which can be used to manufacture moisture or weather resistant corrugated board at normal machine speeds and at an economical adhesive cost.

Certain other objects of the invention will, in part, be obvious and will in part appear hereinafter.

For a more complete understanding of the nature and scope of the invention, reference may now be had to the following detailed description thereof in which the currently preferred embodiment of the invention is set forth in the form of a working example.

The underlying reaction which apparently takes place in practicing the present invention occurs between a phenolic compound, an aldehyde compound and starch in aqueous starch or dextrin paste at an alkaline pH. This reaction is believed to correspond to those described in Patents 2,884,389 and 2,886,541 in which a phenolic-aldehyde resin starch copolymer or reaction product is formed in situ.

As to the three basic reactants that may be used (i.e. starch or dextrin, a phenolic compound and an aldehyde) in general any commercial starch or dextrin is suitable that pastes in alkaline water solutions of borax. Basically, starches and dextrins may be employed which contain sufficient available hydroxyl groups so that a copolymerization reaction can occur between such groups and the other two reactants. The kind of starch or dextrin used for a particular adhesive formulation will depend upon the nature and type of the adhesive desired. For example, if a low solids content adhesive is desired, a thick boiling starch can be used. If a high solids product is desired, dextrin can be used. Mixtures of starch and dextrin may also be used.

Insofar as the phenolic compounds useful in the invention are concerned, they include phenol, hydroquinone, resorcinol, pyrocatechol, pyrogallol and bisphenol.

Referring to aldehydes which are useful, formaldehyde, glyoxal, acetaldehyde, propionaldehyde and furfural may be used. Preferred results have been obtained with resorcinol and formaldehyde although resorcinol-furfural, resorcinol-furfural-formaldehyde, resorcinol-glyoxal, and resorcinol-glyoxal-formaldehyde combinations can be substituted.

Therefore, it will be seen that insofar as the reactants and general conditions of reaction are concerned, the disclosures of Patents 2,884,389 and 2,886,541 are generally applicable. However, there is an important difference in that the resorcinol or other phenolic compound must be used in concentrations less than 2%. The useful ratio of the aldehyde compound to the phenolic compound ranges from 1.3:1 to about 2:1 as taught in these patents. The following example illustrates the manner in which the invention may be practiced on a commercial scale using conventional equipment for preparation of corrugating adhesive after which it is used on conventional corrugating equipment having a "single facer" station (i.e. where a first liner is applied to the tips or one side of the fluted liner) followed by a "double backer" station (i.e. where the second liner is applied to the opposite side of the inner corrugated core).

EXAMPLE I

*700 gallon batch*

|  | Double Backer | Single Facer |
|---|---|---|
| Francis Mixer: |  |  |
| 1. Water to level from top | 106 gal | 106 gal. |
| 2. Add pearl starch | 195.5 lbs | 150.5 lbs. |
| 3. Add resorcinol (may be blended with part of pearl starch) | 14.5 lbs | 14.5 lbs. |
| 4. Agitate until smooth |  |  |
| 5. Add caustic soda in water (25% solution) | 34 lbs | 24 lbs. |
| 6. Heat to | 160° F | 160° F. |
| 7. Hold at this temperature to paste the starch | 10 min | 10 min. |
| 8. Add cold water to level from top | 202 gal | 202 gal. |
| Secondary Mixer: |  |  |
| 1. Water to level from top | 420 gal | 420 gal. |
| 2. Add pearl starch | 1,100 lbs | 885 lbs. |
| 3. Add 10 mol borax | 32 lbs | 24 lbs. |
| 4. Add 37% formaldehyde solution | 22 lbs | 22 lbs. |

Final Mix (100–115° F.):
1. Slowly add contents of Francis mixer to secondary mixer (15–20 minutes).
2. Agitate 15–20 minutes.

The calculated resorcinol concentration in the double backer formulation based on total starch solids is 1.1% while in the single facer formulation, the concentration is 1.4%. The pH value of the pasted carrier in the Francis mixer is about 10 and after addition of the cold water, the temperature is between 100–115° F. This latter temperature is maintained in the final mix. It will be seen that the procedure in preparing a batch of adhesive in accordance with Example I generally parallels the procedure used in producing alkaline, starch-base corrugating adhesive in accordance with the Bauer technique. A number of changes may be made in the formulation and procedure set forth in Example I in regard to the proportions, conditions, and ingredients as the following will indicate.

The pearl starch (corn starch) in the above formulation may be replaced by other kinds of starch such as potato starch, waxy maize starch, wheat starch or dextrins, e.g. white dextrin of medium viscosity and low solubility. However, for economic reasons, corn starch will be used for the most part commercially. The resorcinol may be replaced by a molecular equivalent amount of one of the above named phenolic compounds. Other alkaline materials may be used to adjust the pH, e.g. potassium hydroxide. Instead of formaldehyde or paraformaldehyde, an equivalent amount of another aldehyde of the above-mentioned group may be used.

The contents of the Francis mixer may be heated between a range of 145–165° F. while the pH thereof may be adjusted between 8 to 11. The holding time of the contents of the Francis mixer at the elevated temperature may range from 10 to 30 minutes or more. Although the Corwin et al. patent recommends that the Francis mixer contents be maintained at the elevated temperature for a substantial period of time, the formation of the present invention can be used immediately without loss of water resistance.

The resorcinol concentration may range from about 1% up to about 1.8%. However, for use in making single facer corrugated board the preferred concentration is about 1% while for making double backer board, it is about 1½%. The amount of borax added in the second mixer may range from 16 to 40 pounds per 700 gallon batch or about 1.2 to 3.1% of the total starch solids. Certain changes in procedure will occur to those skilled in the art without departing from the invention as disclosed herein.

Tests were made, using Example I as a general basis, to determine the effect of gelatinization time of varying the concentration of borax or omitting it altogether, and of varying the concentrations of resorcinol and alkali. The results of these tests are summarized in Table I below. The data show that faster gelatinization was obtained by using the full amount of borax normally required for corrugating adhesives (i.e. about 2.4% of the total starch content). When the borax was completely omitted, the time required for gelatinization was doubled. Corrugating machine speed is, of course, directly proportional to gelatinization time.

As an example of the kind of machine speeds to which reference has been made, a normal machine speed of 500 feet per minute gives a satisfactory bond with domestic paste using a light-weight liner. With the same liner, the machine speed must be reduced below about 350 feet per minute when using the high-resorcinol adhesive of the prior art. When the resorcinol content is reduced below about 2%, the machine speed must be reduced to 200 to 250 feet per minute. With the formulations of this invention, the machine speed can again be raised to 500 feet per minute without sacrifice of the bond.

Despite its evident advantages, the use of the present invention does not increase the cost of corrugated board more than a few cents per thousand square feet.

I claim:
1. In the method of preparing alkaline starch base adhesive wherein an aqueous alkaline slurry containing a minor portion of the total starch solids is pasted at a temperature of at least about 145° F. to form the carrier and an aqueous slurry containing the remaining portion of the total starch solids is mixed therewith, said aqueous alkaline slurry of pasted carrier starch containing a small percent based on the total weight of the starch solids of at least one phenolic compound selected from the group consisting of resorcinol, hydroquinone, phenol, pyrocatechol, pyrogallol and bisphenol, and the resultant mixture containing at least one aldehyde selected from the group consisting of glyoxal, furfural, acetaldehyde, propionaldehyde and formaldehyde, said aldehyde being present in a mol ratio of aldehyde to phenolic compound in the range of from about 1.3:1 to about 2:1, the improvement which comprises maintaining the concentration of added phenolic compound between at least about 1% by weight but less than 2% by weight of the total starch solids, and incorporating in the adhesive approximately 1.2 to 3.1% by weight of borax based on the total starch solids to permit said adhesive to be applied at normal corrugating machine speeds.

2. In the method of preparing alkaline starch base corrugating adhesive wherein an aqueous slurry containing a minor portion of the total starch solids and having a pH of about 8 to 11 is pasted at a temperature of about 145 to 160° F. to form the carrier, cold water is added to said carrier to reduce the temperature thereof to about 100–115° F., and an aqueous slurry containing the balance and major portion of the total starch solids is added to said carrier, and the resultant mixture is held at about 100–115° F., with said carrier containing a small percent of resorcinol based on the total weight of the starch solids, TABLE I.—THE EFFECT OF RESORCINOL, CAUSTIC AND BORAX ON PASTING CHARACTERISTICS OF A CORRUGATING ADHESIVE

| Sample | 700 Gallon Formulation | | | | Bauer Viscosity Sec.* | Gel. Temp., °F. | Gel. Rate, Min. |
| | Resorcinol (percent of total starch weight) | NaOH, lb. | Borax, lb. | Percent solids | | | |
| --- | --- | --- | --- | --- | --- | --- | --- |
| A | 1.0 | 28 | 0 | 21.3 | 39 | 136–147 | 2 |
| B | 1.0 | 16 | 0 | 21.3 | 62 | 145–155 | 2 |
| C | 1.0 | 34 | 32 | 20.2 | 42 | 140–145 | 1 |
| D | 1.0 | 24 | 32 | 19.0 | 38 | 148–153 | 1 |
| E | 1.0 | 24 | 24 | 20.0 | 42 | 143–151 | 1.2 |
| F | 1.0 | 16 | 30 | 20.0 | 36 | 147–152 | 1.3 |
| G | 1.0 | 16 | 20 | 20.0 | 36 | 146–156 | 1.5 |
| H | 1.0 | 16 | 10 | 20.0 | 24 | 147–158 | 1.8 |
| I | 1.5 | 24 | 32 | 20.0 | 35 | 147–152 | 1.2 |
| J | 2.0 | 24 | 32 | 20.0 | 23 | 142–154 | 1.3 |
| K | 2.0 | 34 | 32 | 19.5 | 32 | 148–153 | 1.2 |
| L | 2.0 | 16 | 0 | 22.8 | 39 | 145–155 | 2.5 |

*Varied by adjusting the relative proportion of the starch in the carrier (Francis mixer), the total starch solids remaining constant.

Samples of the boxboard prepared in accordance with the invention were tested for the strength of the dry and wet bond. Excellent bonding was observed for all samples examined before water immersion. Water resistance was observed after 24 hours' immersion in tap water at room temperature. Voluntary ply separation did not occur with any samples and each sample offered at least some resistance on tearing apart even though the bonds were not strong enough to pull fibers. Samples of corrugated board made without any resorcinol or aldehyde offer no resistance to tearing apart after immersion and delaminated voluntarily.

and said resultant mixture containing a proportion of formaldehyde to resorcinol in the mol ratio of from about 1.3 to 1 to about 2:1; the improvement which comprises maintaining the concentration of added resorcinol between about 1% and about 1.8% by weight of the total starch solids, and incorporating into the final mixture approximately 1.2 to 3.1% by weight of borax based on the total starch solids to permit said adhesive to be applied at normal corrugating machine speeds.

3. An alkaline starch base adhesive made according to the method of claim 1.

4. An alkaline starch base corrugating adhesive made according to the method of claim 2.

References Cited by the Examiner

UNITED STATES PATENTS

| | | | |
|---|---|---|---|
| 2,650,205 | 8/1953 | Kesler et al. | 260—9 |
| 2,886,541 | 5/1959 | Langlois et al. | 260—17.2 |

OTHER REFERENCES

Tappi: "New Waterproof Adhesive for Corrugating," vol. 39, No. 7, pp. 151A–154A, 1956.

WILLIAM H. SHORT, *Primary Examiner.*

E. W. WOODBERRY, *Assistant Examiner.*